United States Patent
Slade et al.

(10) Patent No.: US 9,980,342 B1
(45) Date of Patent: May 22, 2018

(54) SELF-HEALING LIGHTING DEVICE

(71) Applicant: Grote Industries, LLC, Madison, IN (US)

(72) Inventors: Adam B. Slade, Madison, IN (US); Cesar Perez-Bolivar, Madison, IN (US)

(73) Assignee: Grote Industries, LLC, Madison, IN (US)

( * ) Notice: Subject to any disclaimer, the term of this patent is extended or adjusted under 35 U.S.C. 154(b) by 0 days. days.

(21) Appl. No.: 15/794,922

(22) Filed: Oct. 26, 2017

(51) Int. Cl.
*H05B 33/08* (2006.01)
*B60Q 11/00* (2006.01)

(52) U.S. Cl.
CPC ....... *H05B 33/0893* (2013.01); *B60Q 11/005* (2013.01); *H05B 33/0824* (2013.01)

(58) Field of Classification Search
CPC ............ H05B 33/0815; H05B 33/0866; H05B 33/0803; H05B 33/0842; H05B 33/0893; H05B 33/086; H05B 37/029; H05B 37/0272; H05B 37/0845; Y02B 20/346; Y02B 20/347; F21K 9/00; F21Y 2105/10; F21Y 2103/10; F21Y 2115/10
See application file for complete search history.

(56) References Cited

U.S. PATENT DOCUMENTS

| | | | | |
|---|---|---|---|---|
| 7,178,941 B2* | 2/2007 | Roberge | ................... | F21K 9/00 362/221 |
| 7,646,029 B2* | 1/2010 | Mueller | ................... | F21K 9/00 257/13 |
| 8,093,822 B2* | 1/2012 | Liu | .................... | H05B 33/0815 315/185 R |
| 8,100,552 B2* | 1/2012 | Spero | ....................... | B60Q 1/04 362/227 |
| 8,643,301 B2* | 2/2014 | Kanamori | .......... | H05B 33/0815 315/291 |

* cited by examiner

*Primary Examiner* — Haissa Philogene
(74) *Attorney, Agent, or Firm* — Posz Law Group, PLC

(57) ABSTRACT

A lighting device, including a voltage source; a light engine including one or more lighting elements between a first power line and a second power line; a current detector between the voltage source and the light engine; a switch box between the voltage source and the light engine, connected to the electrical power, to ground, to the first power line, and to the second power line, and configured to switch the light engine between a first configuration in which the first power line is connected to the electrical power and the second power line is connected to ground, and a second configuration in which the second power line is connected to the electrical power and the first power line is connected to ground; a lighting controller configured to generate the switch control signal based on the detected current passing between the voltage source and the light engine.

20 Claims, 6 Drawing Sheets

SELF-HEALING LIGHTING DEVICE

FIELD OF THE INVENTION

This disclosure relates to a self-healing lighting device with multiple sets of lights that can detect when light-emitting elements burn out in one set, and then switch to an alternate set of lights. In particular it relates to a lighting device that switches between at least two alternate lighting sets based on the operation of each lighting set.

BACKGROUND OF THE INVENTION

In many lighting situations, it is necessary to have constant illumination of a certain quality. For example, in automotive lighting, it is necessary for headlights, taillights, and warning lights to be visible and at a certain luminance at all times. This can be for safety reasons or to reduce financial penalties for insufficient lighting. For example, in the trucking industry a truck can be financially penalized if it does not have the regulated amount of lighting functioning properly.

Lighting elements only last a fixed time, however, and will eventually burn out, in part or in whole, due to age, damage, or defect, providing diminished light output, and requiring replacement. This leads to the double problem of noticing that the some or all of the lights in a light source have burned out, and having the materials and facilities to properly replace the burned out lights. In practice, it often takes some time to notice that lights are burned out, and once they are noticed, it takes even more time to get them replaced.

It would therefore be desirable to provide a lighting device that will automatically provide the desired level of lighting even if components within the lighting device cease to function. One way to achieve this is to automatically switch to an alternate, more luminescent lighting set when all or part of a current lighting set burns out.

It would also be desirable to provide a lighting device that warns a user when a light burns out in the device.

SUMMARY OF THE INVENTION

A lighting device is provided, including: a voltage source providing electrical power; a light engine including one or more lighting elements in series between a first power line and a second power line; a current detector located between the voltage source and the light engine, and configured to identify a detected current passing between the voltage source and the light engine; a switch box located between the voltage source and the light engine, connected to the electrical power, to a ground voltage, to the first power line, and to the second power line, and configured to switch the light engine, based on a switch control signal, between a first configuration in which the electrical power is connected to the first power line and the ground voltage is connected to the second power line, and a second configuration in which the electrical power is connected to the second power line and the ground voltage is connected to the first power line; a lighting controller configured to generate the switch control signal based on the detected current passing between the voltage source and the light engine; wherein each lighting element includes a first light-emitting diode in a first orientation, and a second light-emitting diode in a second orientation opposite the first orientation, and in parallel with the first light-emitting diode.

The lighting controller may include a first filter configured to average the detected current over a first time period to generate a first average current; a second filter configured to average the detected current over a second time period to generate a second average current; a comparator configured to determine an absolute difference between the first average current and the second average current; and a signal generator configured to generate the switch control signal based on the absolute difference between the first average current and the second average current, and the first time period is less than the second time period.

The first time period may be in the range of 1 to 100 ms, and the second time period may be between 2 to 10 times as long as the first time period.

The first and second filters may both be infinite impulse response (IIR) filters.

The lighting controller may include a filter configured to average the detected current over a time period to generate an average current; a comparator configured to determine an absolute difference between the average current and a current threshold; and a signal generator configured to generate the switch control signal based on the absolute difference between the average current and the current threshold.

The switch box may further include a double pole, double throw (DPDT) switch controlled by the switch control signal, wherein the DPDT switch is configured to connect the first power line to the electrical power and the second power line to the ground voltage when the switch control signal has a first value, and the DPDT switch is configured to connect the second power line to the electrical power and the first power line to the ground voltage when the switch control signal has a second value.

The switch box may further include an H-bridge configured to connect the electrical power and the ground voltage to the first and second power lines based on the switch control signal.

The H-bridge may further include a first switch connected between the electric power and the first power line; a second switch connected between the first power line and the ground voltage; a third switch connected between the electric power and the second power line; and a fourth switch connected between the second power line and the ground voltage, wherein the switches are single pole, single throw switches, each controlled by the switch control signal, and wherein the switches are configured such that the first and fourth switches will be open and the second and third switches will be closed when the switch control signal has a first value, and the first and fourth switches will be closed and the second and third switches will be open when the switch control signal has a second value.

The lighting device may further include a switching display configured to visibly indicate when the light engine switches from the first configuration to the second configuration or from the second configuration to the first configuration.

The lighting device may further include a switching alert circuit configured to generate a warning signal when the light engine switches from the first configuration to the second configuration or from the second configuration to the first configuration.

The lighting device may further include a wireless transmitter configured to generate a wireless warning signal when the light engine switches from the first configuration to the second configuration or from the second configuration to the first configuration.

A method for controlling a light engine is provided, the light engine including one or more lighting elements in series between a first power line and a second power line, each lighting element including a first light-emitting diode in a first orientation, and a second light-emitting diode in a second orientation opposite the first orientation, and in parallel with the first light-emitting diode, the method including: determining a first average current passing between a voltage source and the light engine over a first time period; determining a second average current passing between the voltage source and the light engine over a second time period; determining an absolute difference between the first average current and the second average current; generating a switch control signal based on the absolute difference between the first average current and the second average current; switching the light engine from a first configuration in which the electrical power is connected to the first power line and the ground voltage is connected to the second power line to a second configuration in which the electrical power is connected to the second power line and the ground voltage is connected to the first power line when the switch control signal has a first value; and switching the light engine from the second configuration to the first configuration when the switch control signal has a second value, wherein the first time period is less than the second time period.

The first time period may be in the range of 1 to 100 ms, and the second time period may be between 2 to 10 times as long as the first time period.

The method may further include generating a visual indicator when the light engine switches from the first configuration to the second configuration or from the second configuration to the first configuration.

The method may further include generating a warning signal when the light engine switches from the first configuration to the second configuration or from the second configuration to the first configuration.

The method may further include transmitting a generating a wireless warning signal when the light engine switches from the first configuration to the second configuration or from the second configuration to the first configuration.

A method for controlling a light engine is provided, the light engine including one or more lighting elements in series between a first power line and a second power line, each lighting element including a first light-emitting diode in a first orientation, and a second light-emitting diode in a second orientation opposite the first orientation, and in parallel with the first light-emitting diode, the method including: determining an average current passing between a voltage source and the light engine; determining an absolute difference between the average current and a threshold value; generating a switch control signal based on the absolute difference between the average current and the threshold value; switching the light engine from a first configuration in which the electrical power is connected to the first power line and the ground voltage is connected to the second power line to a second configuration in which the electrical power is connected to the second power line and the ground voltage is connected to the first power line when the switch control signal has a first value; and switching the light engine from the second configuration to the first configuration when the switch control signal has a second value.

The method may further include generating a visual indicator when the light engine switches from the first configuration to the second configuration or from the second configuration to the first configuration.

The method may further include generating a warning signal when the light engine switches from the first configuration to the second configuration or from the second configuration to the first configuration.

The method may further include transmitting a generating a wireless warning signal when the light engine switches from the first configuration to the second configuration or from the second configuration to the first configuration.

DESCRIPTION OF THE DRAWINGS

The accompanying figures where like reference numerals refer to identical or functionally similar elements and which together with the detailed description below are incorporated in and form part of the specification, serve to further illustrate an exemplary embodiment and to explain various principles and advantages in accordance with the present invention.

DETAILED DESCRIPTION

The instant disclosure is provided to further explain in an enabling fashion the best modes of performing one or more embodiments of the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms such as first and second, and the like, if any, are used solely to distinguish one from another entity, item, or action without necessarily requiring or implying any actual such relationship or order between such entities, items or actions. It is noted that some embodiments may include a plurality of processes or steps, which can be performed in any order, unless expressly and necessarily limited to a particular order; i.e., processes or steps that are not so limited may be performed in any order.

Self-Healing Lighting Device

Figure 1:
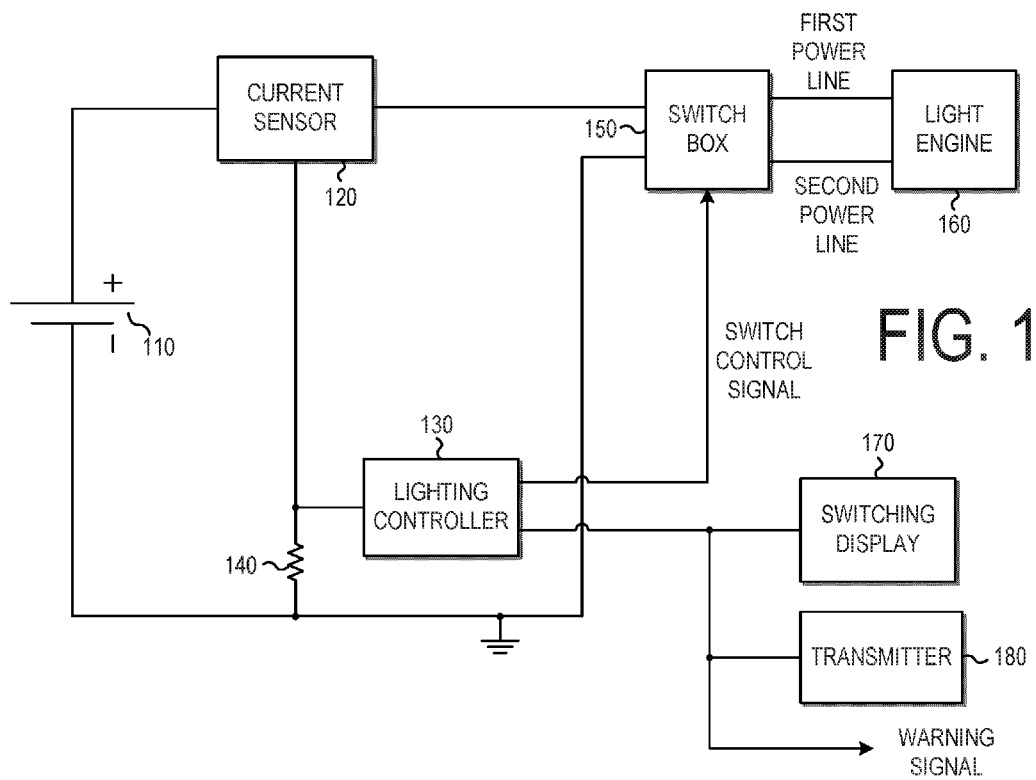
FIG. 1 is a diagram of a self-healing lighting device according to disclosed embodiments.

FIG. 1 is a diagram of a self-healing lighting device 100 according to disclosed embodiments. As shown in FIG. 1, the self-healing lighting device 100 includes a voltage source 110, a current sensor 120, a lighting controller 130, a resistor 140, a switch box 150, a light engine 160, a switching display 170, and a transmitter 190.

The voltage source 110 operates as a main power supply and provides power to the light engine 160. In various embodiments it could be a battery, a generator, an alternator, or any device for providing electrical power.

The current sensor 120 operates to detect the current passing from the voltage source 110 to the light engine 160. In various embodiments, it can directly detect the current, or could detect the voltage across a shunt resistor and derive the current from such a voltage.

The lighting controller 130 operates to control the switch box 150 based on information received from the current sensor 120. In particular, the lighting controller 130 operates to instruct the switch box 150 to switch between available lighting sets contained in the light engine 160.

The resistor 140 is provided to control the input voltage at the lighting controller 130 from the current sensor 120. In some alternate embodiments, this resistor 140 can be eliminated.

The switch box 150 operates to connect one of at least two sets of lighting elements in the light engine 160 to power and ground in a configuration that will cause the lighting elements to light up, based on instructions from the lighting controller 130. The switch box also connects the other of the at least two sets of lighting elements in the light engine 160 to power and ground in a configuration that will cause the lighting elements to not light up, based on instructions from the lighting controller 130.

The light engine 160 contains at least two sets of lighting elements that can be controlled by the switch box 150 to be connected between power and ground in such a way that will cause the lighting elements to light up. Each of the sets of lighting elements contains at least one lighting element. The lighting elements are light-emitting elements, such as light-emitting diodes (LEDs).

In operation, one of the light sets in the light engine 160 will always be illuminated (when the lighting device 100 is on) and the other (or others) will be off. The lighting controller 130 actuates the set of lights with the most functioning lighting elements such that a brighter set of lighting elements selected from these multiple sets of lighting elements will always be operating.

The switching display 170 operates to indicate to a user that a switch has been made between two sets of lighting elements. In this way, the user will be warned that one set of lighting elements has at least partially burned out and should be replaced at the soonest opportunity.

The switching display 170 can be a visual display, an audible display, a combination of visual and audible displays, or any desirable way of warning a user. For example, the switching display could be a warning light, a dashboard display indicator, a flag on an LED display, an audible alarm, etc.

The transmitter 180 operates to transmit a signal to a remote device indicating that a switch has been made between two sets of lighting elements. In this way the self-healing lighting device 100 provides further warning that one set of lighting elements has at least partially burned out and should be replaced of the soonest opportunity.

One possible embodiment for the lighting device 100 is a lighting system for a tractor-trailer. In such an embodiment, the light engine includes a series of automotive lights arranged on the trailer of the tractor-trailer. Various other parts of the lighting device can be in the tractor, the trailer, or the pigtail connecting the tractor to the trailer. Typically, the voltage source 110 will be in the tractor, the current sensor 120, lighting controller 130, and switch box 150 will be in a lamp's pigtail, and the light engine 160 will be in the lamp. However, other combinations of location are possible.

Figure 2:
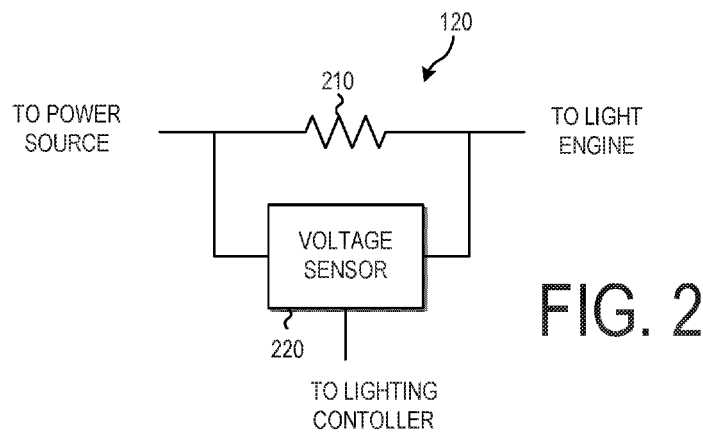
FIG. 2 is a diagram of the current sensor of FIG. 1 according to disclosed embodiments.

FIG. 2 is a diagram of the current sensor 120 of FIG. 1 according to disclosed embodiments. As shown in FIG. 2, this embodiment of a current sensor includes a shunt resistor 210 connected between the voltage source 110 and the light engine 160, and a voltage sensor 220 connected in parallel with the shunt resistor 210.

In this embodiment, the voltage sensor 220 reads the voltage drop across the shunt resistor 210 and, given knowledge of the value of the shunt resistor 210, calculates the current across the shunt resistor 210. The actual calculation of the current can be performed either in the current sensor 120 or in the lighting controller 130.

Alternate embodiments can use other well-known current sensing technologies, such as Hall Effect sensors.

Figure 3:
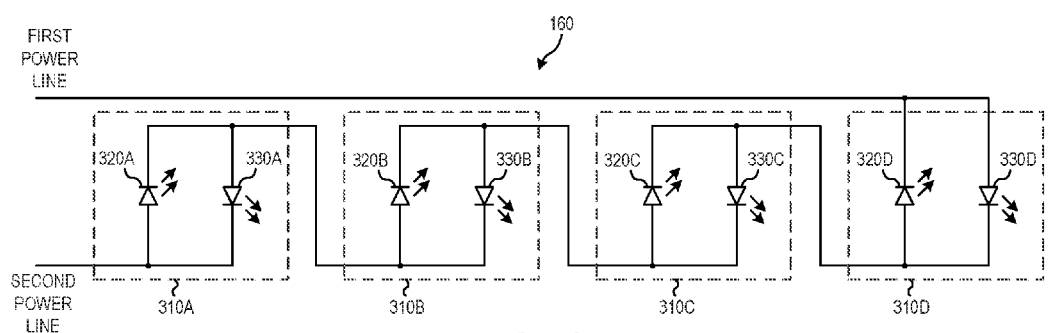
FIG. 3 is a diagram of the light engine of FIG. 1 according to disclosed embodiments.

FIG. 3 is a diagram of the light engine 150 of FIG. 1 according to disclosed embodiments. As shown in FIG. 3, the light engine 150 includes a plurality of lighting modules 310A-310D connected between a first power line and a second power line. For ease of disclosure, these lighting modules can simply be referred to as lighting modules 310.

Each of the plurality of lighting modules 310A-310D includes a first light-emitting element 320, and a second light-emitting element 330. In FIG. 3, these are numbered 320A-320D and 330A-330D. However, for ease of disclosure they can be referred to generically as first light-emitting elements 320 and second light-emitting elements 330. These light-emitting elements 320, 330 can be light-emitting diodes (LEDs) in various embodiments.

Within each lighting module 310 the first lighting element 320 is in a first orientation, i.e. a first polarity, and the second lighting element 330 is in a second orientation, i.e. a second polarity. In other words, each lighting module 310 contains two light-emitting elements 320, 330 of opposite polarities. Each lighting element 320, 330 will be configured such that it will light up when power flows in one direction, but not when power flows in the opposite direction. By having each lighting set contain lighting elements 320, 330 of opposite polarities, the system can ensure that no matter how power and ground are connected, at least one set of lights will always be activated.

Because the first and second lighting elements 320, 330 are of opposite polarities, they can be controlled by selectively connecting the first and second power lines to the voltage source 110 and to ground. For example, in the light engine 150 of FIG. 3, when the first power line is connected to the voltage source 110 and the second power line is connected to ground, the second lighting elements 330A-330D will turn on, while the first lighting elements 320A-320D will remain off. Likewise, when the second power line is connected to the voltage source 110 and the first power line is connected to ground, the first lighting elements 320A-320D will turn on, while the second lighting elements 330A-330D will remain off.

Although FIG. 3 discloses an embodiment that has four lighting modules 310A-310D, this is by way of example only. Alternate embodiments could have more or fewer lighting modules 310 as needed. In addition, although each lighting module 310 is shown as having a single first light-emitting element 320 and a single second light-emitting element 330, this is by way of example only. Alternate embodiments could have multiple first and second light-emitting elements 320, 330 arranged, in series or in parallel, in a single lighting module 310. In such a case, all of the first light-emitting elements 320 would be in a first orientation (first polarity), and all of the second light-emitting elements 330 would be in a second, opposite orientation (second polarity)

In addition, although FIG. 3 shows only lighting modules 310 in series, it is equally applicable to lighting modules 310 provided in parallel, or in any combination of lighting modules 310 in series or parallel, as desired.

Figure 4:
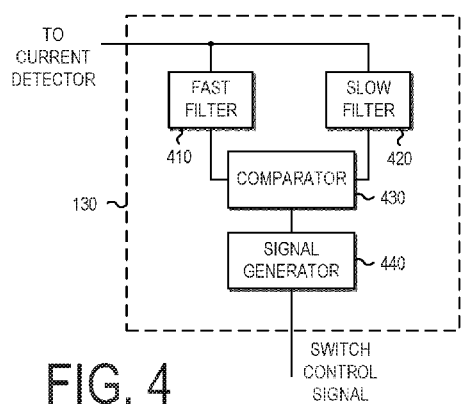
FIG. 4 is a diagram of the lighting controller of FIG. 1 according to disclosed embodiments.

FIG. 4 is a diagram of the lighting controller 130 of FIG. 1 according to disclosed embodiments. As shown in FIG. 4, the lighting controller 130 includes a fast filter 410, a slow filter 420, a comparator 430, and a signal generator 440.

The fast filter 410 is preferably an infinite impulse response (IIR) digital filter applied to the sensed current data that weighs more recent responses more heavily than past values. One example for this weight is 10%, though this is by way of example only and can vary.

The slow filter 420 is also preferably an infinite impulse response (IIR) digital filter applied to the sensed current data that weighs more recent responses more heavily than past values. However, the response to the slow filter 420 is slower than the response to the fast filter 410. One example for this weight is 1%, though this is by way of example only and can vary.

In operation, the fast filter 410 will have a short impulse response so that the output goes to steady state as quick as possible in time, whereas the slow filter 420 will have a long impulse response, whose steady state output occurs after a longer delay, so that it will not be responsive to transient changes in the input. In general, this means that the slow filter 420 will effectively average the current it measures over a long period of time, while the fast filter 410 will effectively average the current it measures over a short period of time.

In some embodiments, the fast filter 410 will measure an average over approximately 1 to 100 milliseconds, and the slow filter 420 will measure an average over a time period approximately 2 to 10 times as long as the time period used by the fast filter 410. These time periods may vary in alternate embodiments.

The comparator 430 compares the filtering results of the fast and slow filters 410, 420 and determines when their divergence meets a given threshold. In other words, it measures whether the difference between the slow filter 420 and the fast filter 410 exceeds the given threshold.

When the divergence between the slow filter 420 and the fast filter 410 meets the given threshold, the comparator 430 provides a signal to the signal generator 440. One common reason for such a divergence is that one of the light-emitting elements 320, 330 in the light engine 160 has burned out, causing a drop in the average current drawn by the light engine 160. In such a circumstance the fast filter 410 will identify the drop in current before the slow filter 420 identifies the same drop in current, causing a divergence in the outputs of the two filters 410, 420 that can be identified in the lighting controller 130.

The signal generator 440 receives the signal from the comparator 430, and provides a switch control signal to the switch box 150, instructing the switch box 150 to switch between the first light-emitting elements 320A-320D and the second light-emitting elements 330A-330D (or vice versa) when the comparator 430 indicates that the divergence between the output of the fast filter 410 and the output of the slow filter 420 meets the given threshold.

By having two filters, a fast filter 410 and a slow filter 420, the lighting controller 130 looks at the relative change in current drawn by the light engine 160, not the absolute change in current drawn. As such, the lighting controller 130 remains independent of the absolute current drawn by the light engine 160. This means that the lighting controller 130 will still function even if one or more of the light-emitting elements 320, 330 in the light engine 160 have burned out.

This allows the lighting device 100 to operate to switch the selected set of light-emitting elements 320, 330 multiple times, if necessary. For example, if the lighting device 100 starts with the first set of light-emitting elements 320 on and the second set of light-emitting elements 330 off, it would switch to the second set of light-emitting elements 330 when it detects a large divergence in detected currents (e.g., a burned out light-emitting element 320) when monitoring the first lighting set. Likewise, the lighting device 100 would switch back to the first set of light-emitting elements 320 when it detects another large divergence in detected currents (e.g., a burned out light-emitting element 330) when monitoring the second lighting set. This swapping back and forth between the set of first light-emitting elements 320 and the set of second light-emitting elements 330 could then continue, as necessary. In each case, the selected set of light-emitting elements 320, 330 should have the largest possible number of functioning light-emitting elements 320, 330, meaning that a maximum possible amount of light will be always be produced by the light engine 160. This would also spread out the wear in the light-emitting elements 320, 330 to maximize the lifespan of the light engine 160 as a whole.

Alternate embodiments of the lighting controller 130 could eliminate the fast filter 410 and in place use a fixed threshold for the comparator 430. This fixed threshold would represent the expected current draw for the light engine 160 when all elements were functioning. In this case the output of the slow filter 420 would be compared to the fixed threshold instead of the output of the fast filter 410. This would function just as described above, except that once each set of light-emitting elements 320, 330 had a single burned out light-emitting element 320, 330, the threshold would cease to be an accurate representation of the expected current drawn by the light engine 160.

In various embodiments the functions of the comparator 430 and the signal generator 440 can be divided or combined as desired. For example, the functionality of both could be implemented on a single microcontroller. Likewise, the comparator 430 could operate as a subtractor, subtracting one of the fast filter 410 and the slow filter 420 from the other and providing the absolute value of the difference to the signal generator 440.

Figure 5:
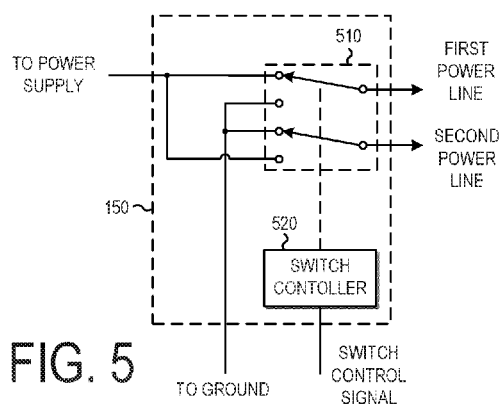
FIG. 5 is a diagram of the switch box of FIG. 1 according to disclosed embodiments.

FIG. 5 is a diagram of the switch box 150 of FIG. 1 according to disclosed embodiments. As shown in FIG. 5, the switch box 150 contains a dual-pole, dual-throw (DPDT) switch 510, and a switch controller 520.

The DPDT switch 510 operates to selectively connect the first power line and the second power line to a voltage source/main power supply 110 and ground. In a first position, the DPDT switch 510 connects the first power line to the main power supply 110 and the second power line to ground, while in a second position the DPDT switch 510 connects the second power line to the main power supply 110 and the first power lines to ground. In operation, the DPDT switch 510 will begin connected in one of the first and second positions.

The switch controller 520 operates to control the DPDT switch 510 based on a switch control signal received from the signal generator 440 in the lighting controller 130. In particular, the switch control signal indicates that the switch controller 520 should instruct the DPDT switch 510 to move to the opposite position (i.e., to move from the first position to the second position, or to move from the second position to the first position).

In one embodiment, the switch controller 520 can be an electrical relay that mechanically switches the orientation of the DPDT switch 510 based on a switch control signal. Alternate embodiments can use alternate types of switch controllers 520.

In some embodiments, the switch controller 520 can be eliminated completely, and the DPDT switch 510 can be controlled directly by the switch control signal.

Although the embodiment of FIGS. 1-5 disclose the use of a DPDT switch, this is by way of example only. Alternate embodiments could employ different varieties of switches to achieve the same function of a DPDT switch. For example, the switching function of the DPDT switch could be achieved by the use of multiple single-pole, single-throw (SPST) switches. In such an embodiment, however, it might be necessary to generate additional switch control signals.

Self-Healing Lighting Device—Alternate Embodiments

Figure 6:
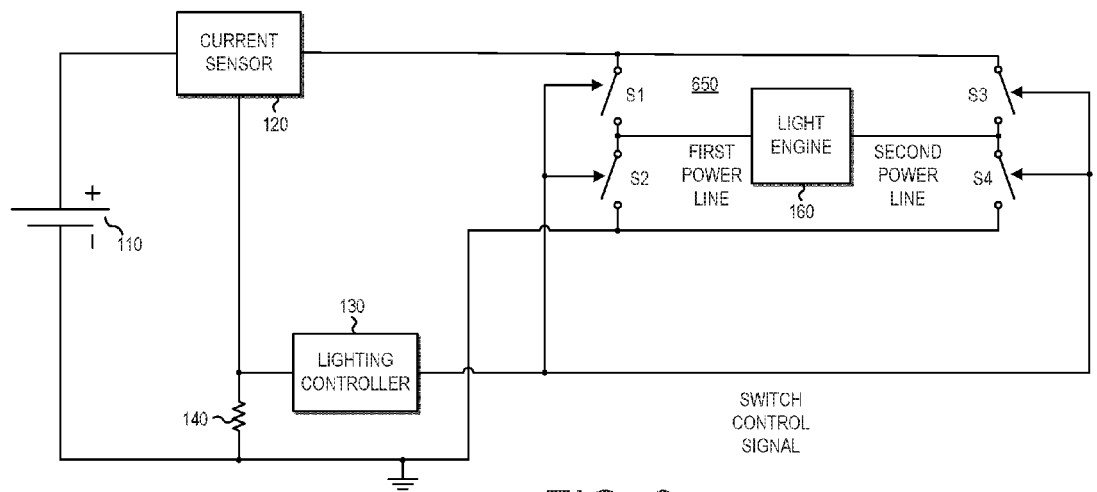
FIG. 6 is a diagram of a self-healing lighting device according to other disclosed embodiments.

FIG. 6 is a diagram of a self-healing lighting device 600 according to other disclosed embodiments. In particular, FIG. 6 uses an H-bridge 650 instead of a switch box 150 to connect the light engine to the voltage source 110 and ground. This embodiment operates just as described above with respect to the first disclosed embodiment, except that the switch box 150 has been replaced with first through fourth switches S1, S2, S3, S4, arranged in an H-bridge configuration 650, which are directly controlled by the switch control signal.

In the H-bridge configuration, the first switch S1 is connected between the voltage source 110 and the first power line; the second switch S2 is connected between ground and the first power line; the third switch S3 is connected between the voltage source 110 and the second power line; and the fourth switch S4 is connected between ground and the second power line.

The switches S1, S2, S3, S4 are controlled such that the first and fourth switches S1, S4 will always be in the same position (i.e., open or closed), and the second and third switches S2, S3 will always be in the same position (i.e., open or closed). The switches S1, S2, S3, S4 are also controlled such that when the first and fourth switches S1, S4 are closed, the second and third switches S2, S3 are open, and such that when the first and fourth switches S1, S4 are open, the second and third switches S2, S3 are closed. The switches S1, S2, S3, S4 are further controlled such that they will each reverse their orientation position when they received the switch control signal.

The configuration of FIG. 6 operates in a manner similar to that of the embodiment of FIG. 1, selectively connecting the first power line and the second power line between the voltage source 110 and ground. In one orientation, the first and fourth switches S1, S4 will be closed and the second and third switches us to, S3 will be open. This will cause the first power line to be connected to the voltage source 110 and the second power line connected to ground. In this orientation, the second light-emitting elements 330A-330D will be activated and the first light-emitting elements 320A-320D will not be activated. In another orientation, the first and fourth switches S1, S4 will be open and the second and third switches us to, S3 will be closed. This will cause the second power line to be connected to the voltage source 110 and the first power line connected to ground. In this orientation, the first light-emitting elements 320A-320D will be activated and the second light-emitting elements 330A-330D will not be activated.

Although not shown in FIG. 6, this alternate embodiment can include a switching display 170 and a transmitter 180 that operate as shown above with respect to FIG. 1.

In some alternate embodiments, multiple switch control signals can be provided to control the operation of the switches S1, S2, S3, S4. This will add some complexity to the lighting controller 130, but could simplify the operation of the switches S1, S2, S3, S4.

In some embodiments a switch controller can be added to provide finer control over the operation of the first through fourth switches S1, S2, S3, S4.

Figure 7:
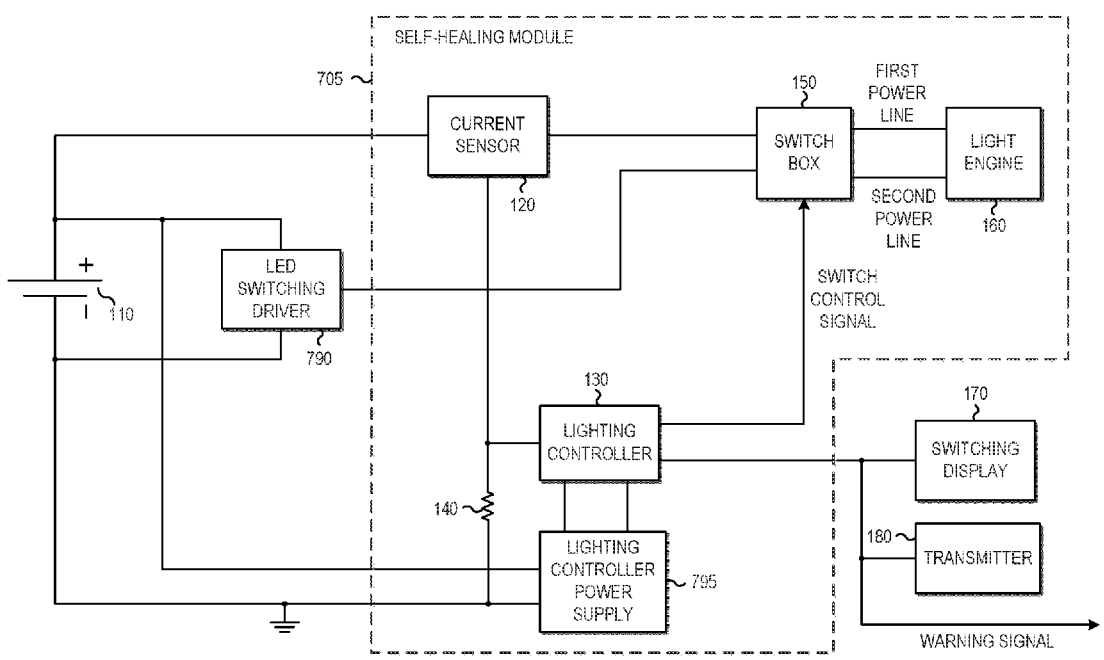
FIG. 7 is a flowchart describing the operation of a self-healing lighting device according to disclosed embodiments.

FIG. 7 is a diagram of a self-healing lighting device 700 according to yet other disclosed embodiments. In particular, the embodiment of FIG. 7 includes an LED switching driver 790 between the voltage source 110 and a self-healing module 705 that includes the current sensor 120, the lighting controller 130, the resistor 140, the switch box 150, and the light engine 160. This allows for dimmed light-emitting elements. This embodiment also includes a lighting controller power supply 795 that is provided for the lighting controller 130, so that the operation of the lighting controller 130 will not be adversely effected by the operation of the LED switching driver 790.

The switching driver 790 is put in-line with the self-healing module 705, so that it receives the ground circuit from the switch box 150. This allows the switching driver 790 the ability to dim the LEDs in the light engine 160 by varying its switching rate. This switching rate is typically very rapid (e.g., greater than 20 KHz) so as to make sensor measurements approximate to an average current drawn by the light engine 160.

The lighting controller power supply 795 is connected to the voltage source 110 and to ground, and provides power to the lighting controller 130. The lighting control power supply 795 bypasses the switched ground signal provided by the LED switching driver 790 so as to provide constant power for the lighting controller 130.

Method of Operation

Figure 8:
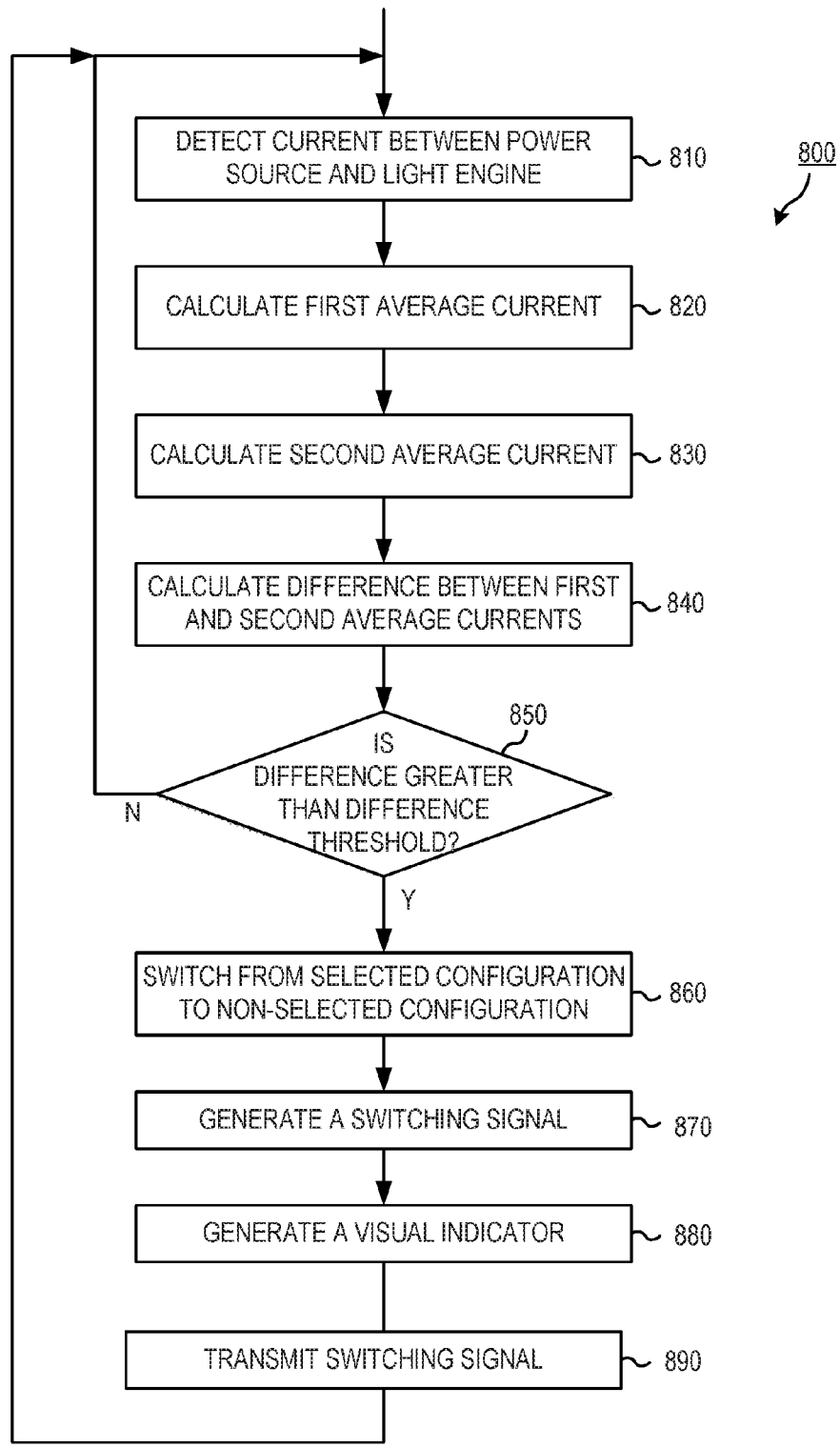
FIG. 8 is a flowchart describing the operation of a self-healing lighting device according to other disclosed embodiments.

FIG. 8 is a flowchart 800 describing the operation of a self-healing lighting device according to disclosed embodiments.

As shown in FIG. 8, operation begins by detecting the current between a power source and a light engine (810).

Operation continues by calculating a first average current over a first time period (820), and a second average current over a second time period based on the measured current between the power source and the light engine (830). In some embodiments, the first time period and second time period will differ from each other such that the second time period is typically 2 to 10 times as long as the first period. In some embodiments, the first time period can be in the range of 1 to 100 milliseconds, though these time periods may vary in alternate embodiments.

After determining the first and second average currents, the system then calculates the difference between the second and first average currents (840). Under normal operation, the first and second average currents should be approximately the same. But, should a light-emitting element in the active light set of the light engine burn out, the first and second average currents will fall to a lower value. However, since the first average current is determined over a first time period that is shorter than the second time period, in the case of a burned out light-emitting element, the first average current will drop to a lower value before the second average current similarly drops its value, showing a temporary divergence in these two currents. It is this divergence that is measured, i.e., the difference between the second average current and the first average current.

Typically, therefore, it will be desirable to subtract the first average current (i.e., the current measured over a shorter time period) from the second average current (i.e., the current measured over a longer time period). This will give a value either close to zero, in the case where no light-emitting element has burned out, or a positive value, in the case where a light-emitting element has recently burned out. In alternate embodiments, the exact implementation of this determination can be varied. For example, the second average current can be subtracted from the first average current to give a negative value. Alternately, the absolute value of the difference between the two average currents can be determined. Various ways of making this determination will be understood by those of ordinary skill in the art.

Once the difference between the second and first average currents has been determined, the system then determines whether the measured difference is greater than a difference threshold (850). In the case where the second average value is subtracted from the first average value to give a negative value, however, it would be necessary to determine whether the difference is lower than the difference threshold. Essentially, this operation determines whether the first average current (i.e. the current measured over a shorter time period) is currently lower than the second average current (i.e., the current measured over a longer time period) by more than a certain amount (i.e., the difference threshold).

If the difference is not greater than the difference threshold, then the system assumes all is well with the light engine, and operation continues by repeatedly detecting the current between the power source and light engine (810), calculating the first and second average currents (820, 830), calculating the difference between these currents (840) and determining whether the difference is greater than the difference threshold (850).

If, however, the measured difference is greater than the difference threshold, the system determines that a lighting element in the light engine has burned out, and switches from a selected lighting set of the light engine to a non-selected lighting set of the light engine (860). In particular, this involves switching from providing power to a first set of light-emitting elements such that they will light up and providing power to a second set of light-emitting elements such that they will not light up, to providing power to the first set of light-emitting elements such that they will not light up, and providing power to the second set of light-emitting such that they will light up.

The system then generates a warning signal (870), which indicates that a failure has occurred in the light engine.

Next, the system may generate a sensory indicator to alert a user that a failure has occurred in the light engine (880). This sensory indicator can be a visual indicator (e.g. a light or indicator on a dashboard panel), an auditory indicator (such as a buzzer or an alarm), or any other sensory indicator that might be desirable.

Finally, the system may transmit the warning signal to a remote device indicating that a failure has occurred in the light engine (890). This transmission can be a wired or wireless transmission, as desired. It is also possible that the transmission may be made over different mediums to different sources. For example, if the light engine is a series of lights on the tractor trailer, the transmission of the warning signal may be sent to a microprocessor in the tractor over a wired or wireless transmission to warn a driver that a light has burned out, and may also be sent via a wireless (e.g., cellular) transmission to also warn a home office of the light failure.

Once the switch has been made (860), the warning signal generated (870), the sensory indicator generated (880), and the warning signal transmitted (890), operation continues by repeatedly detecting the current between the power source and light engine (810), calculating the first and second average currents (820, 830), calculating the difference between these currents (840) and determining whether the difference is greater than the difference threshold (850).

In various embodiments, some or all of the operations of generating a warning signal (870), generating a sensory indicator (880), and transmitting the warning signal (890) may be omitted.

Method of Operation—Alternate Embodiment

Figure 9:
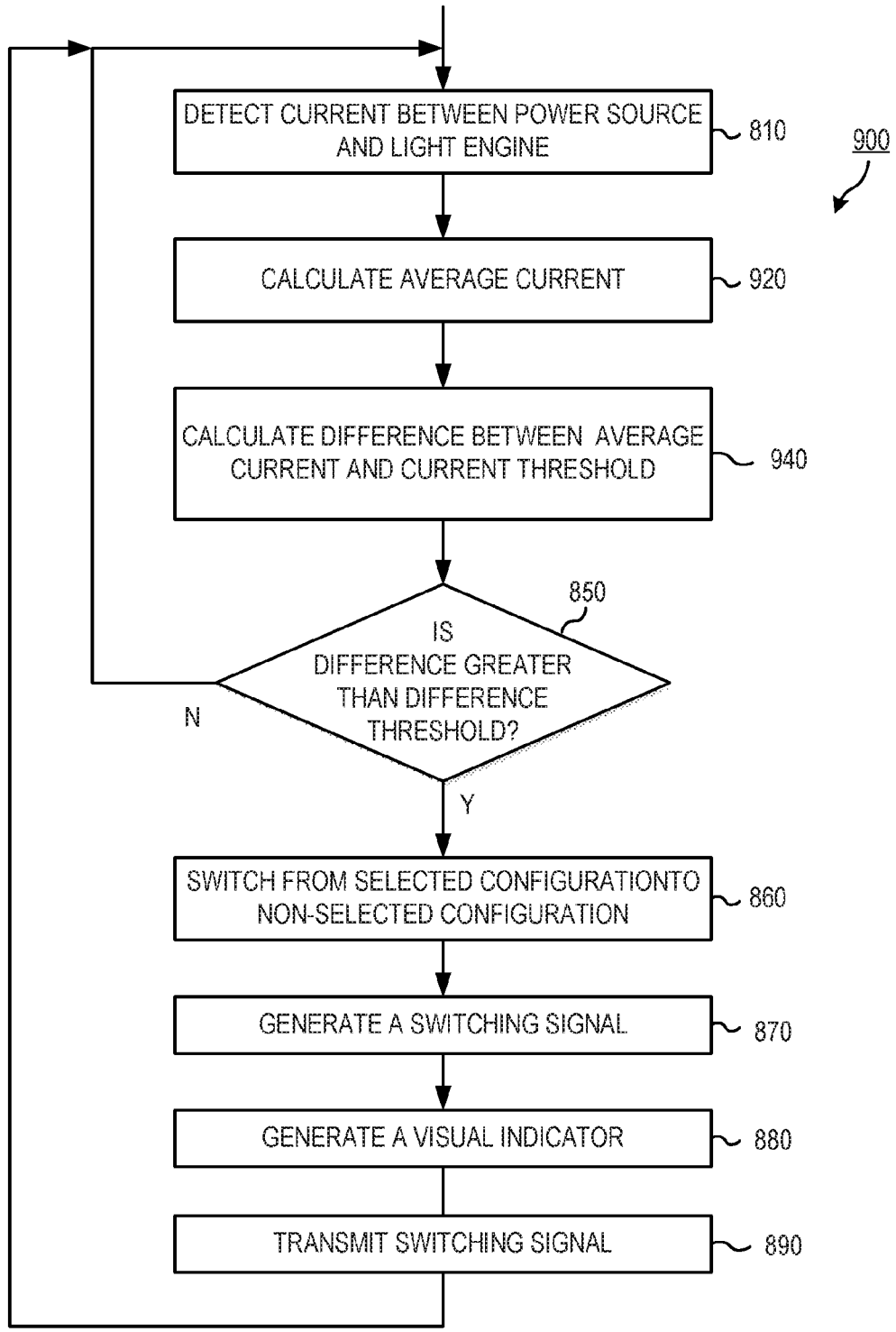
FIG. 9 is a flowchart describing the operation of a self-healing lighting device according to yet other disclosed embodiments.

FIG. 9 is a flowchart 900 describing the operation of a self-healing lighting device according to other disclosed embodiments.

The operation described in the flowchart 900 of FIG. 9 is the same as that described above with respect to FIG. 8, except that rather than calculating a first average current (820), calculating a second average current (830) and calculating a difference between the first and second average currents (840), this alternate operation calculates a single average current (920) and then calculates the difference between the single average current and an absolute current threshold (940).

This difference between the single average current and the absolute current threshold is then used in operation 850 to determine whether a light has burned out. As noted above, this fixed threshold will be calibrated to the average current draw for a fully functioning set of lights. Once a single light-emitting element fails for a set of light-emitting elements, the average current used by that set of lights will always indicate failure, causing the lighting controller to want to switch to the other set. If all of the available sets of light-emitting elements have a burned out light-emitting element, then the lighting controller will constantly wish to switch to a new lighting set. If may be necessary in such an embodiment to include functionality in a lighting controller such that no more switching occurs once a certain number of switches have been made, or perhaps if too many switches are made in a given time period. It may be desirable to keep the warning indicator active until the light engine is repaired, however.

This implementation may limit the flexibility of the resulting lighting device, but could be easier and cheaper to manufacture, and might be desirable in some circumstances. For example, it could be useful in an embodiment in which no light failures can be tolerated.

Other Alternate Embodiments

Although the embodiments of FIGS. 1-9 disclose embodiments with only two sets of parallel lighting elements 320, 330, with a switch box 150 that switches between the two sets of parallel lighting elements 320, 330, alternate embodiments could employ additional sets of parallel lighting elements with a correspondingly complex switch box 150. For example, one embodiment could have four sets of parallel lighting elements, two of one polarity and two of another polarity, arranged such that the switch box 150 could switch between all four of the sets of lighting elements. This would allow for a longer period of time before the light engine would have to be replaced

What is claimed is:

1. A lighting device, comprising:
   a voltage source providing electrical power;
   a light engine including one or more lighting elements in series between a first power line and a second power line;
   a current detector located between the voltage source and the light engine, and configured to identify a detected current passing between the voltage source and the light engine;
   a switch box
      located between the voltage source and the light engine,
      connected to the electrical power, to a ground voltage, to the first power line, and to the second power line, and
      configured to switch the light engine, based on a switch control signal, between a first configuration in which the electrical power is connected to the first power line and the ground voltage is connected to the second power line, and a second configuration in which the electrical power is connected to the second power line and the ground voltage is connected to the first power line;
   a lighting controller configured to generate the switch control signal based on the detected current passing between the voltage source and the light engine;
   wherein each lighting element includes
      a first light-emitting diode in a first orientation, and
      a second light-emitting diode in a second orientation opposite the first orientation, and in parallel with the first light-emitting diode.

2. The lighting device of claim 1, wherein
   the lighting controller includes
      a first filter configured to average the detected current over a first time period to generate a first average current;
      a second filter configured to average the detected current over a second time period to generate a second average current;
      a comparator configured to determine an absolute difference between the first average current and the second average current; and
      a signal generator configured to generate the switch control signal based on the absolute difference between the first average current and the second average current, and
   the first time period is less than the second time period.

3. The lighting device of claim 2, wherein
   the first time period is in the range of 1 to 100 ms, and
   the second time period is between 2 to 10 times as long as the first time period.

4. The lighting device of claim 2, wherein
   the first and second filters are both infinite impulse response (IIR) filters.

5. The lighting device of claim 1, wherein the lighting controller includes
   a filter configured to average the detected current over a time period to generate an average current;
   a comparator configured to determine an absolute difference between the average current and a current threshold; and
   a signal generator configured to generate the switch control signal based on the absolute difference between the average current and the current threshold.

6. The lighting device of claim 1, wherein the switch box further comprises a double pole, double throw (DPDT) switch controlled by the switch control signal,
   wherein
      the DPDT switch is configured to connect the first power line to the electrical power and the second power line to the ground voltage when the switch control signal has a first value, and
      the DPDT switch is configured to connect the second power line to the electrical power and the first power line to the ground voltage when the switch control signal has a second value.

7. The lighting device of claim 1, wherein the switch box further comprises
   an H-bridge configured to connect the electrical power and the ground voltage to the first and second power lines based on the switch control signal.

8. The lighting device of claim 7, wherein the H-bridge further comprises
   a first switch connected between the electric power and the first power line;
   a second switch connected between the first power line and the ground voltage;
   a third switch connected between the electric power and the second power line; and
   a fourth switch connected between the second power line and the ground voltage,
   wherein the switches are single pole, single throw switches, each controlled by the switch control signal, and
   wherein the switches are configured such that
      the first and fourth switches will be open and the second and third switches will be closed when the switch control signal has a first value, and
      the first and fourth switches will be closed and the second and third switches will be open when the switch control signal has a second value.

9. The lighting device of claim 1, further comprising
   a switching display configured to visibly indicate when the light engine switches from the first configuration to the second configuration or from the second configuration to the first configuration.

10. The lighting device of claim 1, further comprising
    a switching alert circuit configured to generate a warning signal when the light engine switches from the first configuration to the second configuration or from the second configuration to the first configuration.

11. The lighting device of claim 1, further comprising
    a wireless transmitter configured to generate a wireless warning signal when the light engine switches from the first configuration to the second configuration or from the second configuration to the first configuration.

12. A method for controlling a light engine, the light engine including one or more lighting elements in series between a first power line and a second power line, each lighting element including a first light-emitting diode in a first orientation, and a second light-emitting diode in a second orientation opposite the first orientation, and in parallel with the first light-emitting diode, the method comprising:
    determining a first average current passing between a voltage source and the light engine over a first time period;
    determining a second average current passing between the voltage source and the light engine over a second time period;

determining an absolute difference between the first average current and the second average current;

generating a switch control signal based on the absolute difference between the first average current and the second average current;

switching the light engine from a first configuration in which the electrical power is connected to the first power line and the ground voltage is connected to the second power line to a second configuration in which the electrical power is connected to the second power line and the ground voltage is connected to the first power line when the switch control signal has a first value; and switching the light engine from the second configuration to the first configuration when the switch control signal has a second value, wherein the first time period is less than the second time period.

13. The method of claim 12, wherein
the first time period is in the range of 1 to 100 ms, and
the second time period is between 2 to 10 times as long as the first time period.

14. The method of claim 12, further comprising
generating a visual indicator when the light engine switches from the first configuration to the second configuration or from the second configuration to the first configuration.

15. The method of claim 12, further comprising
generating a warning signal when the light engine switches from the first configuration to the second configuration or from the second configuration to the first configuration.

16. The method of claim 12, further comprising
transmitting a generating a wireless warning signal when the light engine switches from the first configuration to the second configuration or from the second configuration to the first configuration.

17. A method for controlling a light engine, the light engine including one or more lighting elements in series between a first power line and a second power line, each lighting element including a first light-emitting diode in a first orientation, and a second light-emitting diode in a second orientation opposite the first orientation, and in parallel with the first light-emitting diode, the method comprising determining an average current passing between a voltage source and the light engine;

determining an absolute difference between the average current and a threshold value;

generating a switch control signal based on the absolute difference between the average current and the threshold value;

switching the light engine from a first configuration in which the electrical power is connected to the first power line and the ground voltage is connected to the second power line to a second configuration in which the electrical power is connected to the second power line and the ground voltage is connected to the first power line when the switch control signal has a first value; and switching the light engine from the second configuration to the first configuration when the switch control signal has a second value.

18. The method of claim 17, further comprising
generating a visual indicator when the light engine switches from the first configuration to the second configuration or from the second configuration to the first configuration.

19. The method of claim 17, further comprising
generating a warning signal when the light engine switches from the first configuration to the second configuration or from the second configuration to the first configuration.

20. The method of claim 17, further comprising
transmitting a generating a wireless warning signal when the light engine switches from the first configuration to the second configuration or from the second configuration to the first configuration.

* * * * *